United States Patent [19]
Hultquist et al.

[11] Patent Number: 5,634,235
[45] Date of Patent: Jun. 3, 1997

[54] WINDSHIELD WIPER ASSEMBLY WITH ARM HEAD RETAINING MEANS

[75] Inventors: Kevin E. Hultquist, Schaumburg, Ill.; Eric A. Armstrong, Valparaiso, Ind.

[73] Assignee: Sprague Device, Inc., Michigan City, Ind.

[21] Appl. No.: 685,449

[22] Filed: Jul. 19, 1996

[51] Int. Cl.⁶ ................................................. B60S 1/34
[52] U.S. Cl. .......................... 15/250.34; 15/250.352; 403/327; 403/326
[58] Field of Search .................. 15/250.34, 250.351, 15/250.352, 250.19, 250.202, 250.31; 403/DIG. 4, 24, 327, 330, 322, 321, 325

[56] References Cited

U.S. PATENT DOCUMENTS

| 2,365,251 | 12/1944 | Curtiss | 15/250.34 |
| 3,711,890 | 1/1973 | Kolb | 15/250.34 |
| 4,947,508 | 8/1990 | Bauer et al. | 15/250.32 |

FOREIGN PATENT DOCUMENTS

| 224474 | 11/1962 | Austria | 15/250.34 |
| 15172 | 9/1980 | European Pat. Off. | 15/250.34 |
| 1226503 | 2/1960 | France | 15/250.34 |
| 1224190 | 6/1960 | France | 15/250.352 |
| 1405818 | 6/1965 | France | 15/250.352 |
| 1455953 | 9/1969 | Germany | 15/250.34 |
| 2121112 | 11/1972 | Germany | 15/250.34 |
| 2356606 | 5/1975 | Germany | 15/250.34 |
| 2511013 | 9/1976 | Germany | 15/250.34 |
| 1381154 | 1/1975 | United Kingdom | 15/250.34 |

*Primary Examiner*—Gary K. Graham
*Attorney, Agent, or Firm*—Baker & Daniels

[57] ABSTRACT

A windshield wiper assembly includes a wiper arm carrying a windshield wiper blade, an arm head, and a pivot attaching the wiper arm to the arm head. A spring retainer and coil spring extends between the arm head and the arm, thereby biasing the wiper blade against the windshield. When the wiper arm is lifted off the windshield to a hold off position, the spring retains the wiper blade in the hold off position. A finger extending from the spring retainer engages a shoulder on a drive drum which is received in a socket in the arm head. Accordingly, the wiper assembly is automatically released from the driving mechanism when the wiper assembly is moved to the inactive or hold off position. The wiper assembly can then be removed from the vehicle, which facilitates changing of the wiper blade.

5 Claims, 3 Drawing Sheets

WINDSHIELD WIPER ASSEMBLY WITH ARM HEAD RETAINING MEANS

BACKGROUND OF THE INVENTION

This invention relates to a windshield wiper assembly for a motor vehicle.

Windshield wipers used on vehicles include a wiper blade attached to a wiper arm. The wiper arm is pivotally attached to the arm head, which is connected through a drive drum to the drive spindle of the windshield wiper motor. The wiper blade, which wipes across the surface of the windshield, must be changed periodically. In commercial vehicles, such as buses and large trucks, it is often difficult to change the wiper blade, because the wiper assembly is a substantial distance off of the ground. Accordingly, it is desirable to remove the entire wiper assembly consisting of the blade, the arm, and the arm head, change the blade, and then reinstall the wiper assembly on the vehicle. Prior art devices include latches that hold the arm head on the spindle which are extremely difficult to release. Windshield wiper assemblies also include a spring that holds the wiper against the surface of the windshield. A spring retainer is often provided that attaches one end of the spring to the arm head and which enables the arm to be moved to an overcenter position where the wiper blade is held off of the windshield. The retainer and the latching mechanism in the prior art devices are entirely separate mechanisms.

SUMMARY OF THE INVENTION

According to the present invention, the spring retainer that couples one end of the spring to the arm head also includes a locking finger which engages the drive drum and thereby locks the arm head to the drive drum when the wiper is in the active position against the windshield. When the wiper arm is moved to the inactive position in which the wiper blade is held away from the windshield, the retainer rotates with the arm as it is rotated between the active and inactive position. The finger, which rotates with the retainer, is thereby rotated out of engagement with the drive drum thereby permitting the arm head and wiper arm to be removed from the drum. Accordingly, the connection between the arm head and the drive drum is released each time the windshield wiper is moved to the inactive position, permitting release of the arm head and permitting its easy removal from the vehicle. These and other advantages of the present invention will become apparent from the following description, with reference to the accompanying drawings, in which:

DETAILED DESCRIPTION

Figure 1:
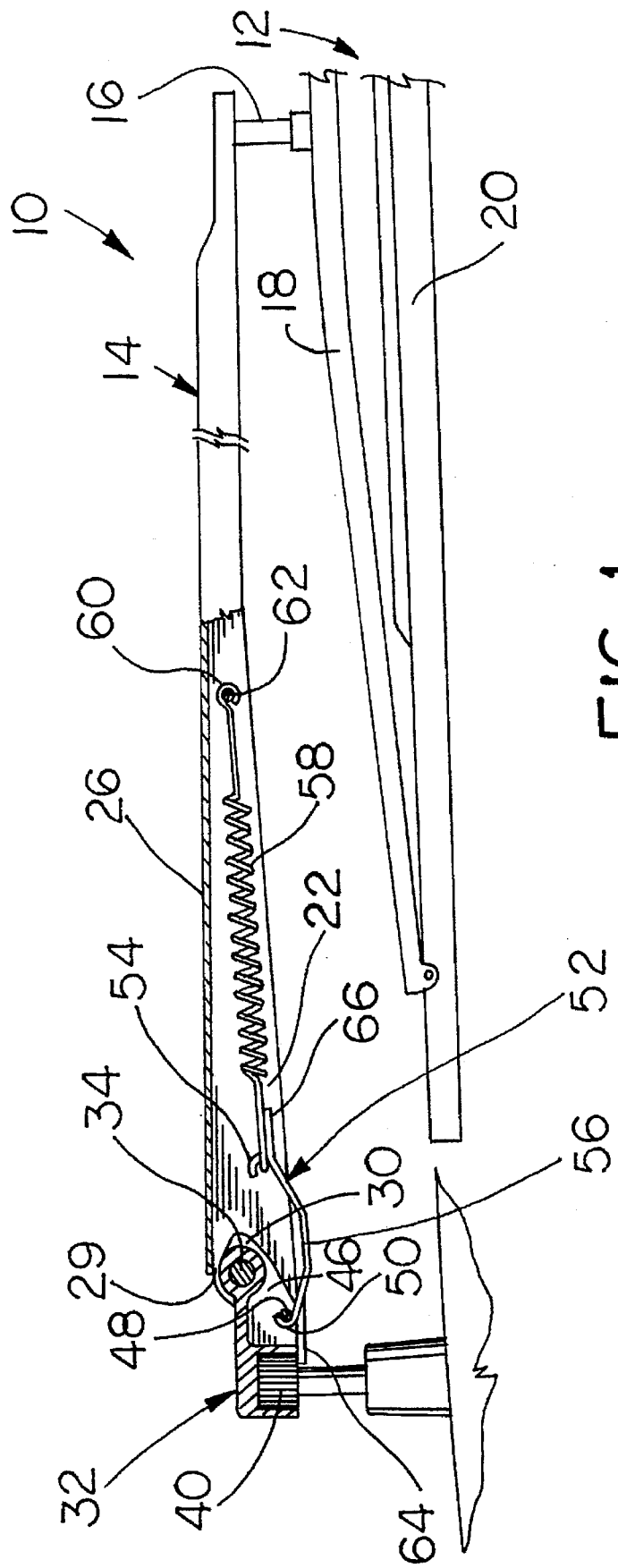
FIG. 1 is an elevational view, partly in section, of a windshield wiper assembly made pursuant to the present invention installed on the front cowling of a motor vehicle, with the wiper blade and wiper arm illustrated in the position they assume when the wiper blade is in the active position against the windshield of the vehicle.

Referring now to the drawings, a windshield wiper assembly generally indicated by the numeral 10 includes a wiper blade generally indicated by the numeral 12 and a wiper arm generally indicated by the numeral 14 which is attached to the wiper blade 12 by a conventional attachment mechanism 16. The wiper blade 12 includes a bowed portion 18 and a squeegee 20, which is held in its active position against the windshield of the vehicle (not shown) for wiping across the windshield. The wiper arm 14 includes a channel portion consisting of a pair of parallel flanges 22, 24 connected by connecting portion 26. An aperture 28 extends through each of the flanges 22, 24. The flanges 22, 24 and connecting portion 26 define an open end 29 which receives connecting end 30 of an arm head 32. A pivot pin or bolt 34 extends through the aperture 28 in the flanges 22, 24 and through an aperture 36 in the end 30 of the arm head 32. The end of the arm head 32 opposite the end 30 defines a splined socket 38 which receives a correspondingly splined drum head 40 mounted on a spindle 42 which is pivotally mounted in cowling 44 of the vehicle and which is rotated by a windshield wiper motor (not shown) when the windshield wipers are turned on to move the wiper blade 23 across the windshield. The drum 40 cooperates with the spindle 42 to define a shoulder 44 therebetween.

The drum head 32 defines a recess 46 which opens toward the end 30 of the arm head 32. An elongated member 52 formed into a spring retainer consisting of a bowed body portion 56 interconnecting a pair of bifurcated ends. One bifurcated end consists of fingers 64, 50, the finger 50 being formed into a hook, and the other bifurcated end consists of fingers 54, 66, the finger 54 being formed into a hook. The hook 50 pivotally engages pivot pin 48 which is carried in the arm head 32. One end of a coiled spring 58 terminates in a hook 60 which hooks around the hook 54 on the retainer 52. The other end of the spring 58 terminates in a hook 60 which extends around a pin 62 interconnecting the flanges 22, 24 of the wiper arm 14. It will be noted that the finger 64 is sufficiently long that it engages the shoulder 44 of the drum 40 when the wiper arm 14 is disposed in the position illustrated in FIG. 1. Accordingly, the finger 64 prevents removal of the wiper arm 14 from the drum 40 as long as the wiper arm remains in the FIG. 1 position. Finger 66 is identical to the finger 64 but extends from the opposite end of the retainer 52; accordingly, the retainer 52 is symmetrical and may be installed with either of the hooks attached to the spring 58 or the pin 48.

Figure 2:
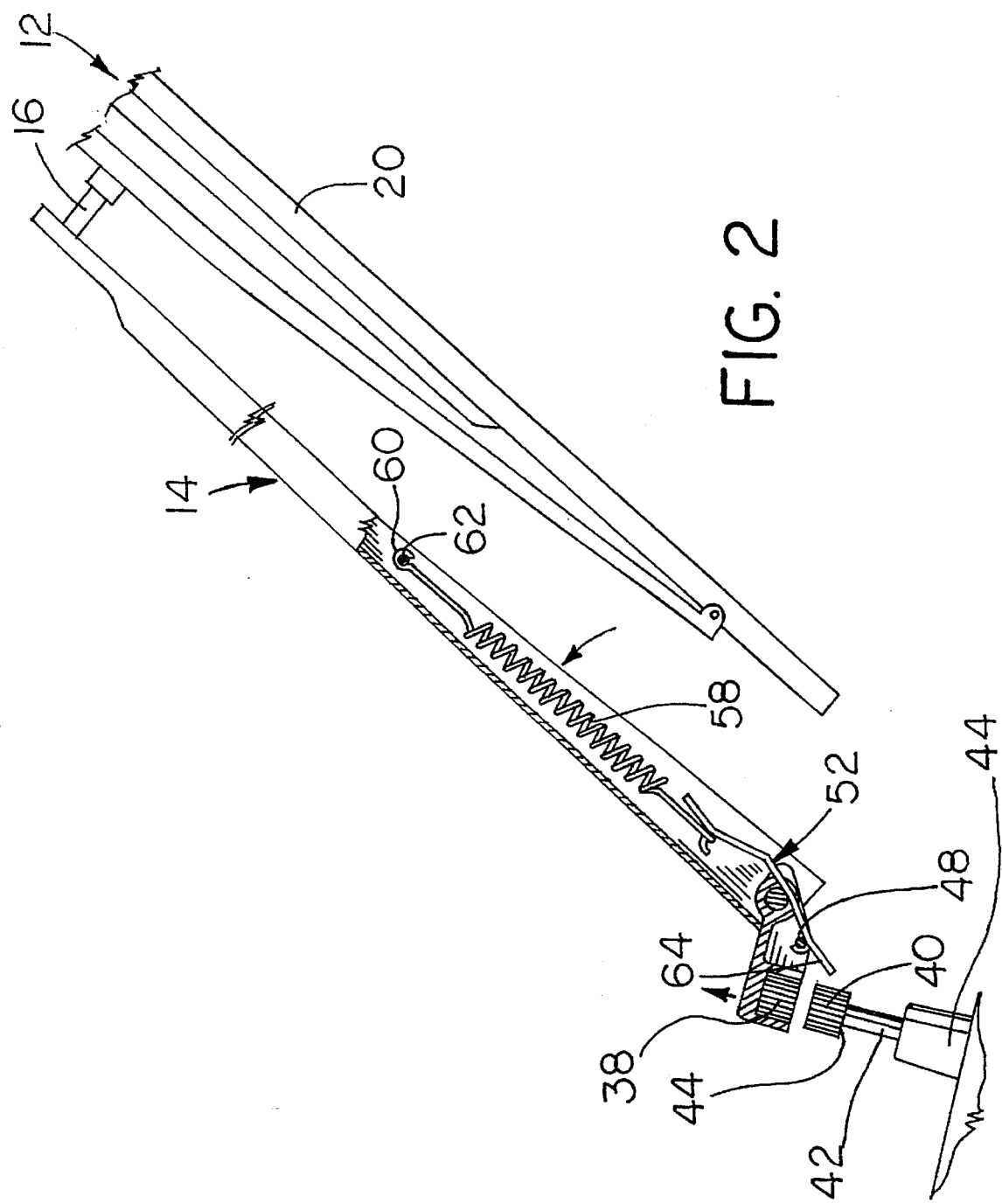
FIG. 2 is a view similar to FIG. 1, but illustrating the wiper blade and wiper arm in the inactive position in which the wiper blade is lifted off of the windshield.
Figure 3:
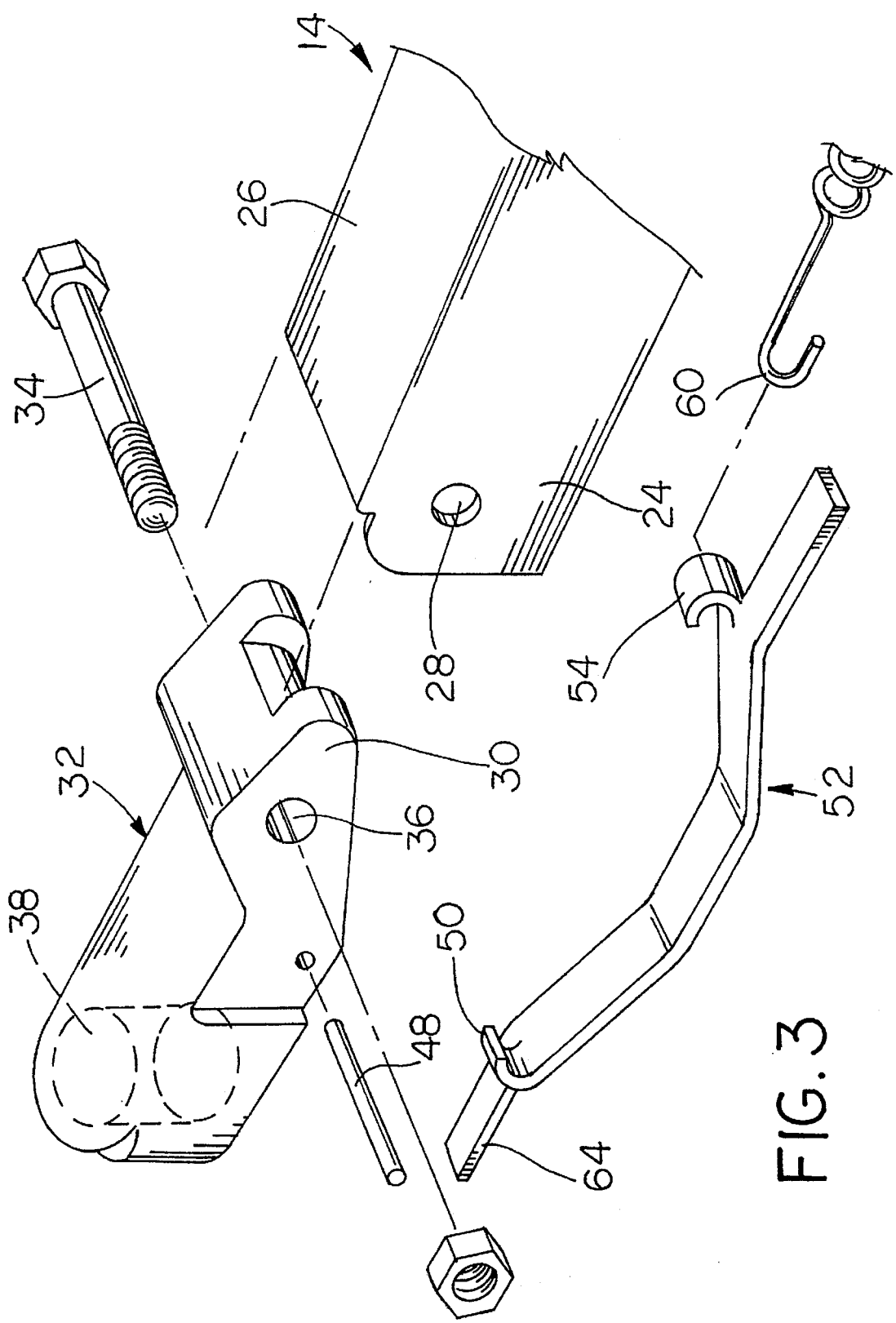
FIG. 3 is an exploded, fragmentary perspective view of the arm head and windshield wiper arm used in the windshield wiper assembly used in FIGS. 1 and 2.

As discussed above, the wiper assembly 10 is illustrated in FIG. 1 with the wiper blade 12 in its active position in which the squeegee 20 is biased against the vehicle windshield. The bias of the blade 12 against the windshield is controlled by the spring 58, which biases the arm 14 about the pivot 34 because of the connection of the spring 58 between the arm 14 through the retainer 52 to the pin 48 on the arm head 32. In the active position, the finger 64 engages the shoulder 44 on the drum 40, thereby locking the arm head 32 on the drum and preventing it from being accidentally dislodged therefrom. However, the arm 14 may be pivoted about the pivot pin 34 to lift the squeegee 20 off of the windshield. When the wiper arm 14 has been rotated to the inactive position of FIG. 2, the line of action of the spring 58 has moved across the pivot 34, such that the bias of the spring 58 holds the wiper arm in the position illustrated in FIG. 2. As the wiper arm 14 is rotated about the pivot 34, the finger 64 is also rotated away from the shoulder 44, since rotation of the arm 14 also rotates the spring retainer 52 about the pin 48. Accordingly, when the wiper arm 14 has been rotated into the FIG. 2 position, the entire assembly may be lifted off of the drum 40, by pulling on the arm head 32. Accordingly, the wiper assembly 20 is automatically released from the drum 40 when it is rotated to the inactive position illustrated in FIG. 2, thereby permitting easy removal of the wiper assembly so that the replaceable parts, such as the wiper blade 12, may be easily replaced with the wiper assembly off of the vehicle. The assembly can then be reinstalled by installed the socket 38 on the drum 40 and then rotating the arm 14 back to the active position. As this occurs, finger 64 will reengage the shoulder 44. Accordingly, it will be noted that the spring retainer 52 both holds the spring 58 in place, and locks the wiper assembly onto the drum 40.

We claim:

1. Windshield wiper assembly for a vehicle said assembly comprising a wiper arm carrying a windshield wiper blade, an arm head, a pivot pivotally connecting said wiper arm to said arm head to permit movement of the wiper arm about said pivot between an active and an inactive position, drive means releasably connected to said arm head for driving the wiper arm, spring means for biasing said wiper arm to the active position after movement of the wiper arm from the inactive position, said spring means including an elongated spring coupled at one end to said wiper arm and a spring retainer securing an opposite end of said spring to the arm head, said spring retainer being an elongated member having a first bifurcated end and a second bifurcated end, said first bifurcated end defining a pair of fingers, one of said fingers being formed as a hook and pivotally connected to said arm head, the other finger engaging said drive means to hold the arm head and wiper arm on the drive means when the wiper arm is in the active position and disengaging from the drive means to permit removal of the arm head and wiper arm from the drive means when the wiper arm is moved away from the active position.

2. Windshield wiper as claimed in claim 1, wherein said drive means includes a spindle and a drum mounted on said spindle, said arm head including a socket receiving said drum, said other finger engaging said drum to prevent removal of the latter from the socket when the wiper arm is in the active position, said other finger being rotated away from said drum as the wiper arm is moved toward the inactive position to permit said arm head to be removed from the drum.

3. Windshield wiper as claimed in claim 2, wherein one end of said drum cooperates with said spindle to define a shoulder therebetween, said other finger engaging said shoulder when the wiper arm is in the active position.

4. Windshield wiper as claimed in claim 1, wherein said elongated member includes a bowed portion connecting said first bifurcated end with said second bifurcated end, said second bifurcated end including a portion engaging said spring.

5. Windshield wiper as claimed in claim 4, wherein the bifurcated ends are identical to one another.

* * * * *